(12) United States Patent
Millar et al.

(10) Patent No.: US 12,164,698 B2
(45) Date of Patent: Dec. 10, 2024

(54) LOCOMOTION USING FINGER TRACKING

(71) Applicant: VRChat Inc., San Francisco, CA (US)

(72) Inventors: Ronald John Millar, San Rafael, CA (US); David E. Tin Nyo, San Francisco, CA (US); Trevor Goodwin, Daytona Beach, FL (US)

(73) Assignee: VRChat Inc., San Francisco, CA (US)

( * ) Notice: Subject to any disclaimer, the term of this patent is extended or adjusted under 35 U.S.C. 154(b) by 0 days.

(21) Appl. No.: 18/167,486

(22) Filed: Feb. 10, 2023

(65) Prior Publication Data
US 2024/0134460 A1    Apr. 25, 2024

Related U.S. Application Data

(60) Provisional application No. 63/418,512, filed on Oct. 22, 2022.

(51) Int. Cl.
| | |
|---|---|
| *G06F 3/01* | (2006.01) |
| *A63F 13/213* | (2014.01) |
| *G06T 13/40* | (2011.01) |
| *G06T 15/00* | (2011.01) |

(52) U.S. Cl.
CPC ............ *G06F 3/017* (2013.01); *A63F 13/213* (2014.09); *G06F 3/011* (2013.01); *G06T 13/40* (2013.01); *G06T 15/00* (2013.01); *A63F 2300/8082* (2013.01)

(58) Field of Classification Search
CPC ........ G06F 3/017; G06F 3/011; G06F 3/0304; G06F 3/04815; A63F 13/213; A63F 2300/8082; A63F 2300/5553; A63F 13/56; G06T 13/40; G06T 15/00; G06T 19/003; G06T 7/70
See application file for complete search history.

(56) References Cited

U.S. PATENT DOCUMENTS

| | | | |
|---|---|---|---|
| 9,067,097 B2 * | 6/2015 | Lane | ................ G06V 40/23 |
| 10,921,879 B2 | 2/2021 | Ravasz et al. | |
| 11,086,475 B1 * | 8/2021 | Ravasz | ................ G06F 3/011 |
| 11,461,973 B2 | 10/2022 | Pinchon | |

(Continued)

FOREIGN PATENT DOCUMENTS

| | | |
|---|---|---|
| EP | 3 079 041 B1 | 4/2015 |
| WO | 2021/021328 A2 | 2/2021 |
| WO | 2021/021328 A3 | 2/2021 |

OTHER PUBLICATIONS

International Search Report, dated Jul. 17, 2024; Application # PCT/US2024/019412.

(Continued)

*Primary Examiner* — Douglas M Wilson
(74) *Attorney, Agent, or Firm* — Polsinelli PC

(57) ABSTRACT

The present technology provides a mechanism by which a player can make a gesture with their hands which can bring up a virtual controller, wherein hand movements and finger tracking can result in locomotion of an avatar through a virtual world without need for a hardware controller. Therefore, a player can have a natural conversion or otherwise control the hands of their avatar to interact with other objects in the virtual world, and then use the avatar's hands to bring up a virtual controller to control locomotive movements of their avatar without the player of a physical controller.

20 Claims, 15 Drawing Sheets

(56) References Cited

U.S. PATENT DOCUMENTS

2020/0387213 A1* 12/2020 Ravasz ................... G06F 3/011
2022/0198755 A1*  6/2022 Pinchon ................ G06T 19/003

OTHER PUBLICATIONS

Chaowanan Khundam; "First Person Move1nent Control with Palm Norrmal and Hand Gesture Interaction in Virtual Reality"; 2015 12th International Joint Conference on Computer Science and Software Engineering (JCSSE); 978-1-4799-1966-6.

* cited by examiner

US 12,164,698 B2

LOCOMOTION USING FINGER TRACKING

CROSS-REFERENCE TO RELATED APPLICATIONS

This application priority to U.S. provisional application No. 63/418,512, filed on Oct. 22, 2022, which is expressly incorporated by reference herein in its entirety.

BACKGROUND

Virtual reality (VR) provides an immersive virtual world environment wherein players often experience the virtual world from a first person perspective. In many ways, players experiencing the virtual world in the first person perspective feel as if they are actually in the virtual world, except of course, for the equipment they use to access the virtual world and to control their avatar. Players access a virtual world though a VR headset which is often coupled with hand held controllers. Sometimes players also utilize additional skeleton tracking devices and haptic feedback devices. While the equipment can provide additional inputs to support more realistic movements by an avatar, the equipment can also provide limitations on how immersed a player might be in the virtual world.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
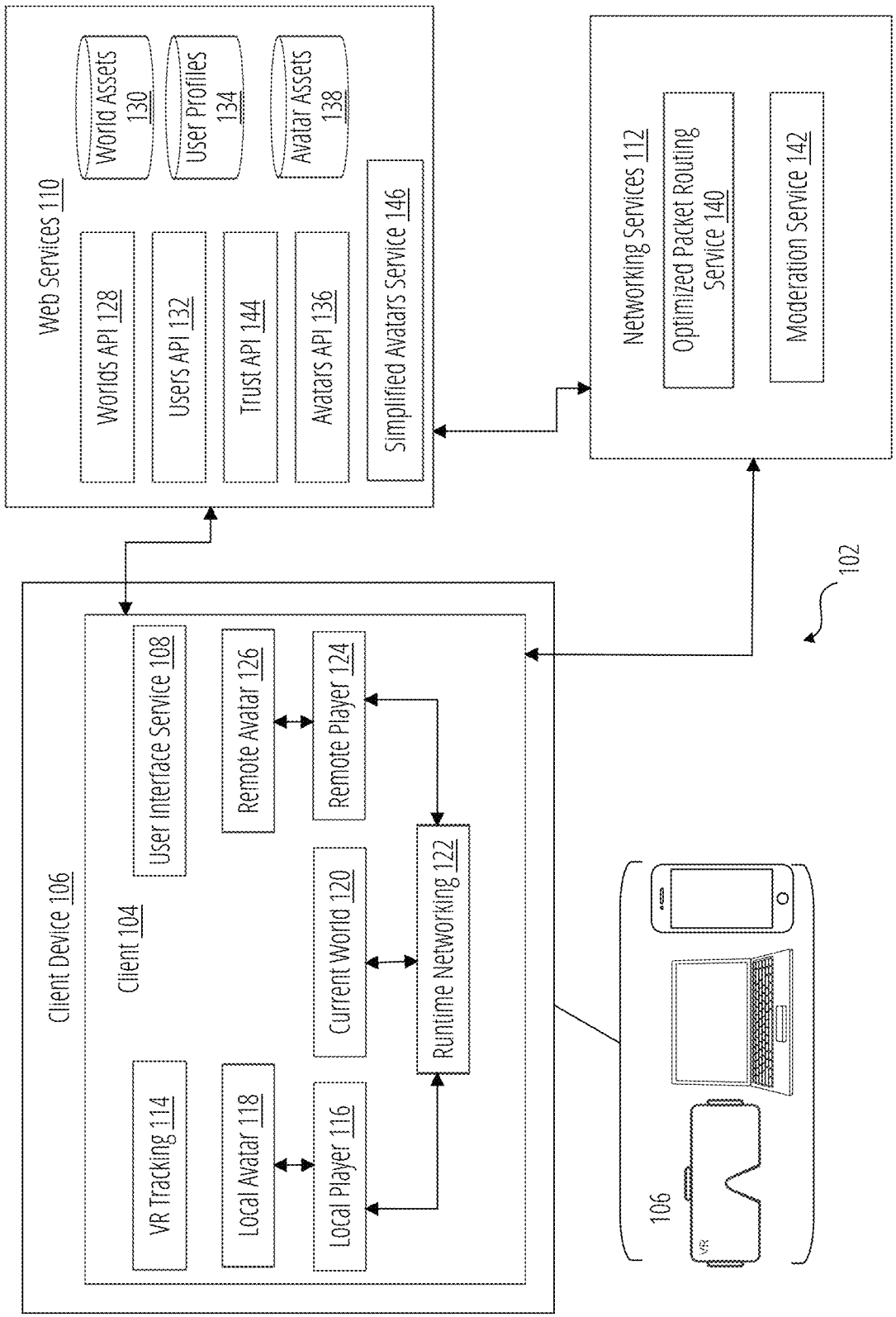
FIG. 1 illustrates an example virtual world platform for playing and hosting a multiplayer virtual reality (VR) experience in accordance with some aspects of the present technology.

Some client devices for interacting in virtual reality include hand tracking capabilities. Hand tracking has been used in virtual reality environments to control appendage movements of avatars. For example, in a virtual world where a player that is represented by their avatar is talking, it can helpful to show the avatar's hands moving since many people "talk with their hands" by making various gestures that go along with their speech. Of course, participants in a conversation where at least one member of a conversation is hearing impaired might speak using sign language.

While hand tracking makes for a more realistic conversational experience in virtual reality, it comes with a drawback in that most players will need to put down any controllers that they might normally use for locomotion (players provide inputs into the controllers to navigate their avatar through a virtual world). This leads to a problem in that a player that has put down their controllers will need to find their controllers before they can navigate their avatar throughout a virtual world, and this is a cumbersome user experience.

The experience can be even more cumbersome when the client (VR headset) needs to once again detect the controllers and remap the controllers in physical space (also called the room space) into the virtual world, which takes a few moments.

Virtual reality provides a fully immersed experience, and the need to interact with controllers can sometimes impair the virtual reality experience. Accordingly, there is a need to be able to navigate a virtual reality world without controllers. And there is a need to allow a player to seamlessly transition from conversation to locomotion.

The present technology provides a mechanism by which a player can make a gesture with their hands which can bring up a virtual controller, wherein hand movements and finger tracking can result in locomotion of an avatar through a virtual world without the need for a hardware controller. Therefore, a player can have a natural conversion or otherwise control the hands of their avatar to interact with other objects in the virtual world and then use their hands to bring up a virtual controller to control locomotive movements of their avatar without the player of a physical controller.

The present technology also addresses the complexity of controlling locomotion of an avatar in a virtual world through hand and finger tracking of a player's hands in the room space. The complexity is that while the avatar changes position in the virtual world, the player has not changed their position in the room space; i.e, the player has only moved their hands. Therefore, when the avatar moves position, but the player has not, the player's hands can map to a location other than the location of the avatar. This can give the impression that the avatar has left the virtual controller behind.

This phenomenon can be the result of the fact that the client device can report a position for fingers making a gesture, which fingers are involved in the gesture, a confidence value that a detected gesture is correctly identified, a position for the hand, a rotation of the hand, etc. The virtual controller is instantiated in the virtual world at a corresponding position, but the avatar quickly moves from that position.

To overcome this complexity, the present technology can change the position of the joystick as the avatar moves. This can be complicated when the avatar is moving in multiple directions and rotations at once, such as when an avatar is strafing and rotating at the same time. A further level of complexity comes not only from changing the position of the virtual controller but also maintaining the position of the virtual controller relative to the avatar in a position that provides a good player experience.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a player of the client device 106 upon which client 104 is executing and handles third party inputs received from another player operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various player settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive player inputs through a hardware interface to navigate through the worlds menu and to receive a selection of a world to visit.

Another user interface provided by user interface service 108 pertains to various player settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the player's avatar (local player 116) or be seen by the player's avatar when they are both in the same world. For example, it may be desirable to avoid interacting with newer players of the virtual world platform 102 since they have not built up trust within the virtual world platform 102. It may also be desirable to limit the features of a remote player's avatar that will be processed by the instance of client 104 to which the local player is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a player has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a player travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a player's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a player's body are tracked by VR tracking service 114. While some players might have full skeleton tracking, many players may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a player, the local player can still derive a full skeleton for the player and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other players in the current world 120 instance.

The local player 116 and the remote player 124 are similar in that they are collision volumes that move around the environment in the current world 120. The main difference is that the local player 116 is controlled by client 104, and the player of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the player a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a player can pick up, and the object needs to broadcast its state across the network so that other players in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all players in an instance of a virtual world.

In addition to the general broadcasting of state information to all players interacting with an instance of a virtual world, the optimized packet routing service 140 provides more advanced features that provide an enhanced player experience and enforces other virtual world platform 102 properties, such as trust and safety configurations.

For example, to provide an enhanced player experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a player accesses a world, especially a private world, moderation service 142 can call the worlds API 128 to ensure the player can enter the world. In another example, there can be instances where two different players attempt to claim control of an object in a virtual world at approximately the same time. The moderation service 142 can handle those sorts of conflicts by selecting a particular player to control an object until they relinquish the control of the object, which allows another player to claim control of the object. A player that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
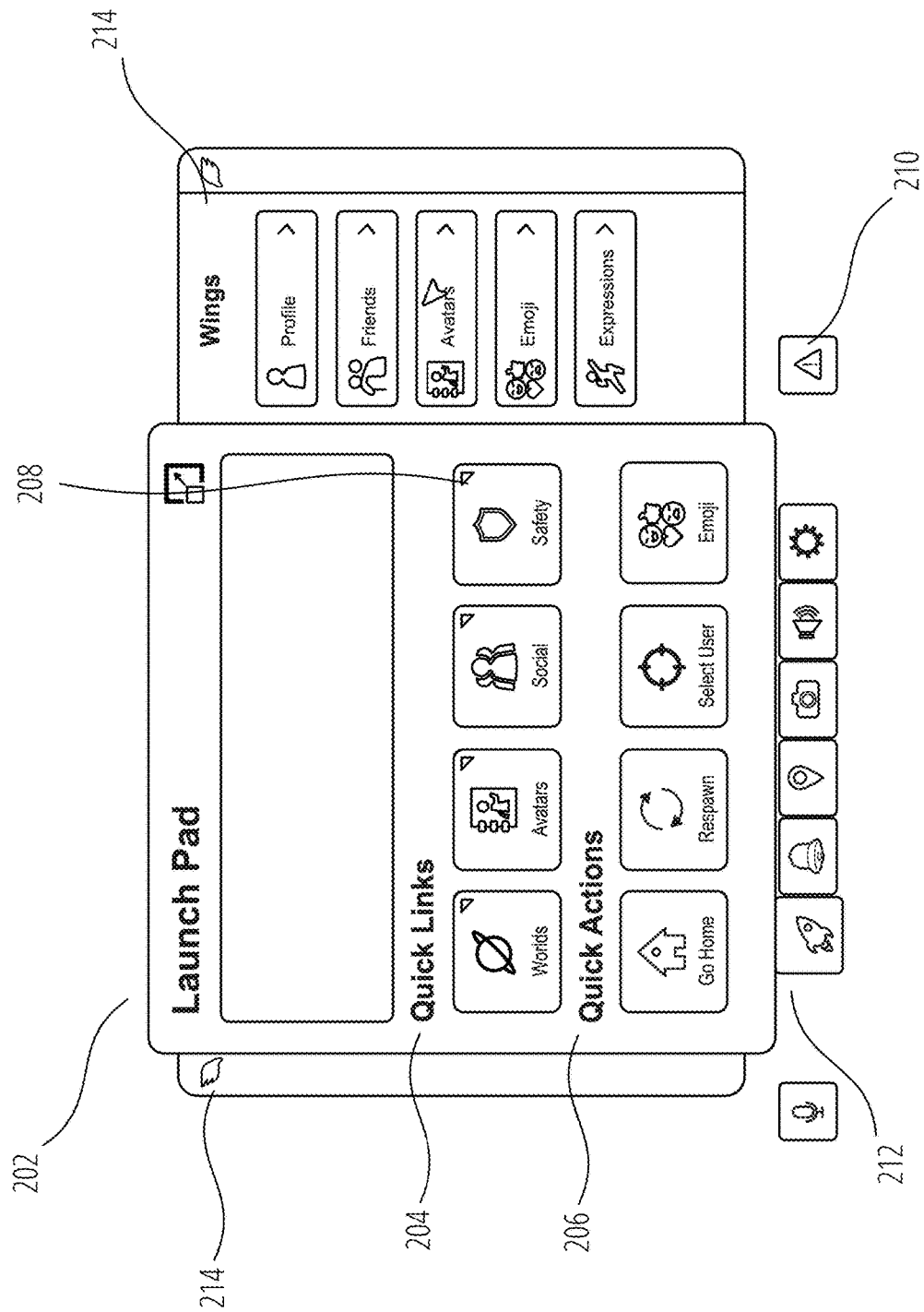
FIG. 2 illustrates an example quick menu in accordance with some aspects of the present technology.

FIG. 2 illustrates an example quick menu 202 in accordance with some aspects of the present technology. In particular, the quick menu 202 can be surfaced by the user interface service 108 on client 104 at any time or place in the virtual world platform 102.

The quick menu 202 includes a quick links 204 section that includes many commonly used menu options such as menus to browse worlds, avatars, friends, and a safety menu 208 to set safety settings for the user's profile.

The trust and safety menu 208 provides the user account with the ability to determine which remote players 124 can see the user's avatar (local player 116) or be seen by the player's avatar when they are both in the same world. For example, it may be desirable to avoid interacting with newer players of the virtual world platform 102 since they have not built up trust within the virtual world platform 102. It may also be desirable to limit the features of a remote player's avatar that will be processed by the instance of client 104 to which the local player is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic or safe mode 210 to audio-and-visually mute anybody who is not a friend.

The quick menu 202 can also include a quick actions 206 section to provide frequently used actions in a convenient location. Some example quick actions include an action to go to your homeworld, to respawn in the last world you were in, to select another player's avatar (to communicate privately, to block the player from viewing or speaking to the local player 116, to copy the avatar or other function), and to select emojis.

The quick menu 202 also includes a dock 212, which also provides access to some common features like a virtual camera, volume settings, and a settings menu, among other features.

Figure 3:
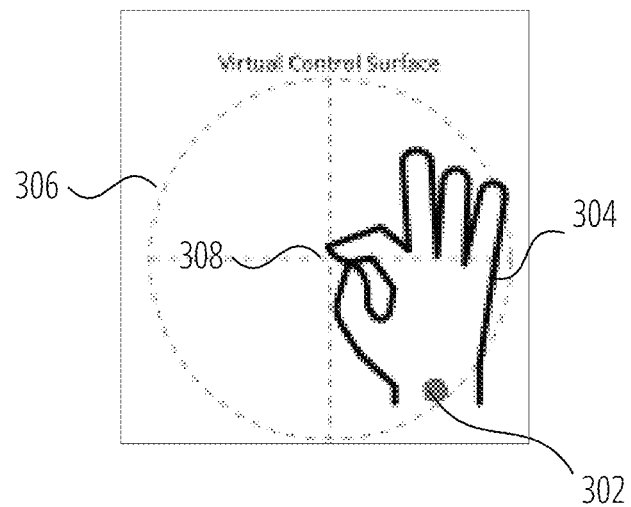
FIG. 3 illustrates an example of a relationship between a gesture and an instantiation of a virtual controller as well as the operation of the virtual controller in accordance with some aspects of the present technology.
Figure 3:
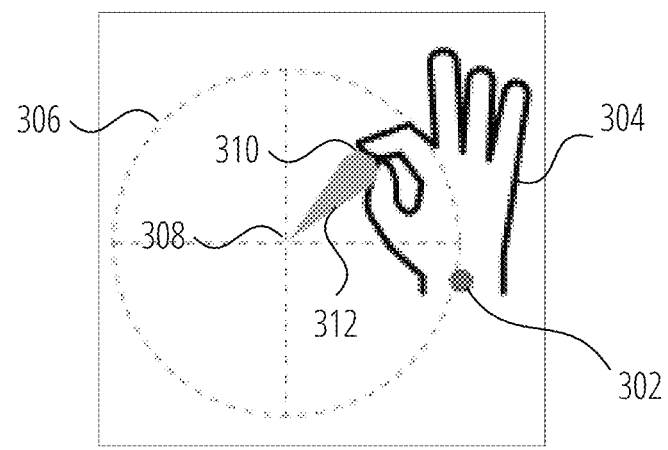

FIG. 3 illustrates an example of a relationship between a gesture and an instantiation of a virtual controller as well as the operation of the virtual controller.

In the top image of FIG. 3, the client device 106 recognizes a pinch gesture created by the player's hand and sends a description of the location of the player's hand in room space along with information about the location of the player's fingers and any recognized gesture with a confidence score pertaining to the gesture to client 104. The VR tracking service 114 can map the location of the player's hand to offset 302. The offset 302 is approximated to be a position near the palm of the avatar relative to the character root. So that if a player controls an avatar to reach for something or point for something, the offset is a good place near the avatar's hand in which to place the hand. The offset is configured to work well with multiple avatars regardless of the scale (size) of the avatar. Offset 302 can be utilized to map a hand of any size on a player of any size to an avatar's hand of any size on an avatar of any size. Offset 302 acts as a point based on which an avatar's hand 304 can be drawn.

In response to receiving information from the client device 106 that the hand is posing in a pinch gesture, VR tracking service 114 causes client 104 to instantiate a virtual controller at the location in which the pinch gesture was created. As illustrated by virtual controller perimeter 306, the virtual controller can include a larger control surface, although the control surface may be transparent. Additionally, the virtual controller includes a joystick instantiation point at the initial pinch point 308. This joystick instantiation point can be a visible dot or other indicator signaling to the player that the joystick is active.

In the bottom picture of FIG. 3, the player's hand has moved from the original location in room space to a second position in room space. The client device 106 can recognize that the player's hand has moved while maintaining the pinch gesture pose. The client device 106 can again report data regarding the position of the hands, the position of the fingers, the recognition of the gesture and the confidence that the client device 106 recognized the gesture correctly to the VR tracking service 114. The VR tracking service 114 can cause the avatar's hand 304 to move along with offset 302, which also repositions the pinch point to the current pinch location 310. In response, the client 104 can illustrate a joystick 312 originating at the joystick instantiation point at the initial pinch point 308 of the virtual controller and terminating at the current pinch location 310 of the avatar's hand 304 to demonstrate that a movement input has been received.

In some embodiments, the joystick 312 has an incline or wedge shape, which is used to visually demonstrate a velocity for the movement of the avatar. The further the current pinch location 310 is from the joystick instantiation point at the initial pinch point 308, the faster the velocity of the movement of the avatar. This is demonstrated by a larger wedge shape.

The movements of the virtual controller can be constrained to a plane made up of the x and y axes (i.e., forward, backward, and strafing, but not up and down).

Figure 4A:
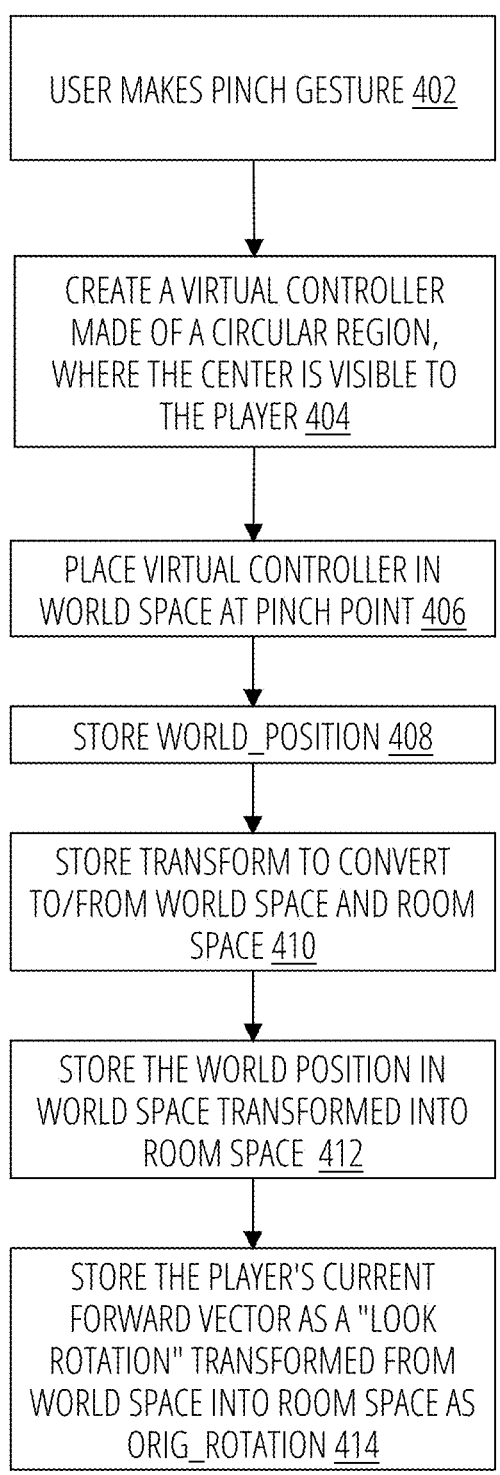
FIG. 4A illustrates an example routine for controlling locomotion of an avatar through finger tracking in accordance with some aspects of the present technology.
Figure 4A:
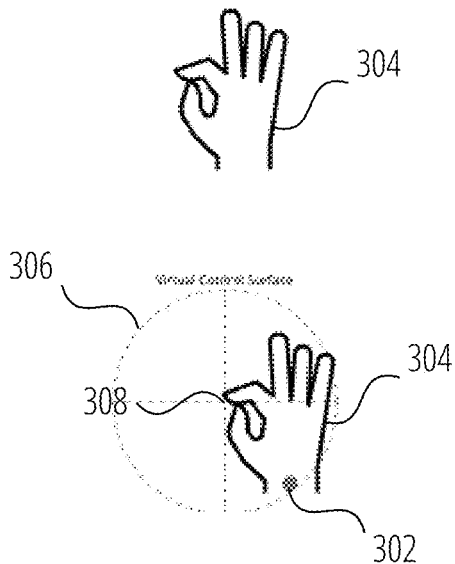

FIG. 4A illustrates an example routine for controlling locomotion of an avatar through finger tracking. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

A player can cause a virtual controller to be created when they perform a pinch gesture at block 402.

The client device 106 can be endowed with finger tracking technology. Generally, the client device 106 might be a VR headset that includes one or more cameras capable of capturing images of the player's fingers. The cameras can be physically integrated with the virtual reality headset or external to the VR headset and communicatively coupled to the VR headset. The VR headset can also include software that is capable of mapping a position of the player's hands and fingers in room space (real-world space) to a position in world space (virtual world space). The VR headset can report information about the location of a hand, fingers, location of fingers, recognized gestures, a confidence that a gesture was correctly identified, etc. to the client 104, which receives this information through its VR tracking service 114.

Using the information received by the VR tracking service 114 from the client device 106 (e.g., VR headset) client 104 can create a virtual controller made of a circular region where the center is visible to the player at 404. In some examples, only the center of the circular region is visible to the player. In some examples, the center of the circular region is a joystick for controlling the locomotion of the avatar.

The client 104 can place the virtual controller in world space at the pinch point at block 406. The pinch point is the location in the world space to which the player's hand and fingers in the room space are mapped. In some examples, the VR tracking service 114 maps the position of the hand in the room space to a location in the world space, and the position of the avatar's fingers is approximated from the location of the hand in the world space.

The client 104 can store a on offset in the world space for the location of the hand relative to the character root in the virtual world at block 408.

The complexity of controlling locomotion of an avatar in a virtual world through hand and finger tracking of a player's hands in room space is that while the avatar changes position in the virtual world, the player has not changed their position in the room space; i.e, the player has only moved their hands. Therefore, when the avatar moves position, but the player has not, the player's hands can map to a location in world space other than the location of the avatar. This can give the impression that the avatar has left the virtual controller behind.

This phenomenon can be the result of the fact that the client device can report a position for fingers making a gesture in room space, which fingers are involved in the gesture, a confidence value that a detected gesture is correctly identified, a position for the hand in room space, a rotation of the hand, etc. The virtual controller is instantiated in the virtual world at a corresponding position in world space, but the avatar quickly moves from that position.

To overcome this complexity, the present technology can change the position of the joystick as the avatar moves. This can be complicated when the avatar is moving in multiple directions and rotations at once, such as when an avatar is strafing and rotating at the same time. A further level of complexity comes not only from changing the position of the virtual controller but also maintaining the position of the virtual controller relative to the avatar in a position that provides a good player experience.

The present technology can receive data about hand and finger locations, a gesture, a confidence value, and hand and finger rotations from a VR client device that has hand and finger tracking capabilities and can map that data recorded in the room space into the world space.

An avatar can have a root and a base, which collectively make up a character root. The character root can be an invisible structure in world space to which the visible avatar is mapped. The present technology can determine an offset transform from the root position of the avatar in the world space and can initially locate the virtual controller at the position offset from the root position of the avatar. The offset is approximated to be a position near the palm of the avatar. So that if a player controls an avatar to reach for something or point for something, the offset is a good place near the avatar's hand. The offset is configured to work well with multiple avatars regardless of the scale (size) of the avatar.

As addressed above, the space in which the hand and finger tracking is occurring is relative to the player in room space, but the avatar is moving through the virtual world (aka, world space). To compensate, the present technology takes a snapshot of where the player's hands are relative to the avatar's position in the world space. The snapshot is recorded as a transform from the root position of the avatar to the initial location of the virtual controller.

The client 104 can store a transform to convert to/from world space and room space at block 410.

The transform between a room space and the avatar in the world space takes into account the point that the player chose when they pinched in room space, and that is mapped to an offset from the character root. As the orientation and the position of the avatar changes, the whole relative positioning moves too, using the transforms. The transforms utilize matrix math to translate between the room space and the relative position based on the root of the avatar.

The client 104 stores the world position in world space transformed using the transform into room space at block 412. The client 104 also stores the player's current forward vector in world space as a "Look Rotation" transformed from world space into room space as ORIG_ROTATION at block 414.

In summary, the client 104 encodes the positions of the character root in the world space and the player in room space and snapshots the positions for the transform and saves the transform. As the avatar moves, the transform is moved too so that the transform moves with the player.

The transform tracks the motions of a player's hand and fingers to occur relative to the player in the real-world environment while allowing placement of the controller in the virtual reality environment to occur relative to the position of the character root to which the avatar is mapped. Accordingly, if the avatar moves or rotates, the snapshotted transform moves along with that avatar. As a player moves their fingers in room space relative to the initial position in which the virtual controller was instantiated in world space (the position at which the gesture was made to cause the virtual controller to be instantiated) the client 104 is measuring the distance of movement based on the real world movement. At the same time, the client 104 moves the center position of the virtual controller relative to the base of the character root and transforms the hand movements in the room space into the world space. That way, even if the player moves the avatar's head relative to the character root (base of the avatar) the position of the virtual controller relative to the character root is preserved. Therefore, movement controls are relative to the character root of the avatar even if the avatar's head is rotated relative to the base of the avatar to allow the avatar to look in a different direction than the direction they are moving. The same behavior is true whether the movement is to rotate, move forward, strafe, or any combination of those. The same behavior is also true in other dimensions that might permit roll, pitch, and yaw, to facilitate lift, decent, turns, etc.

Figure 4B:
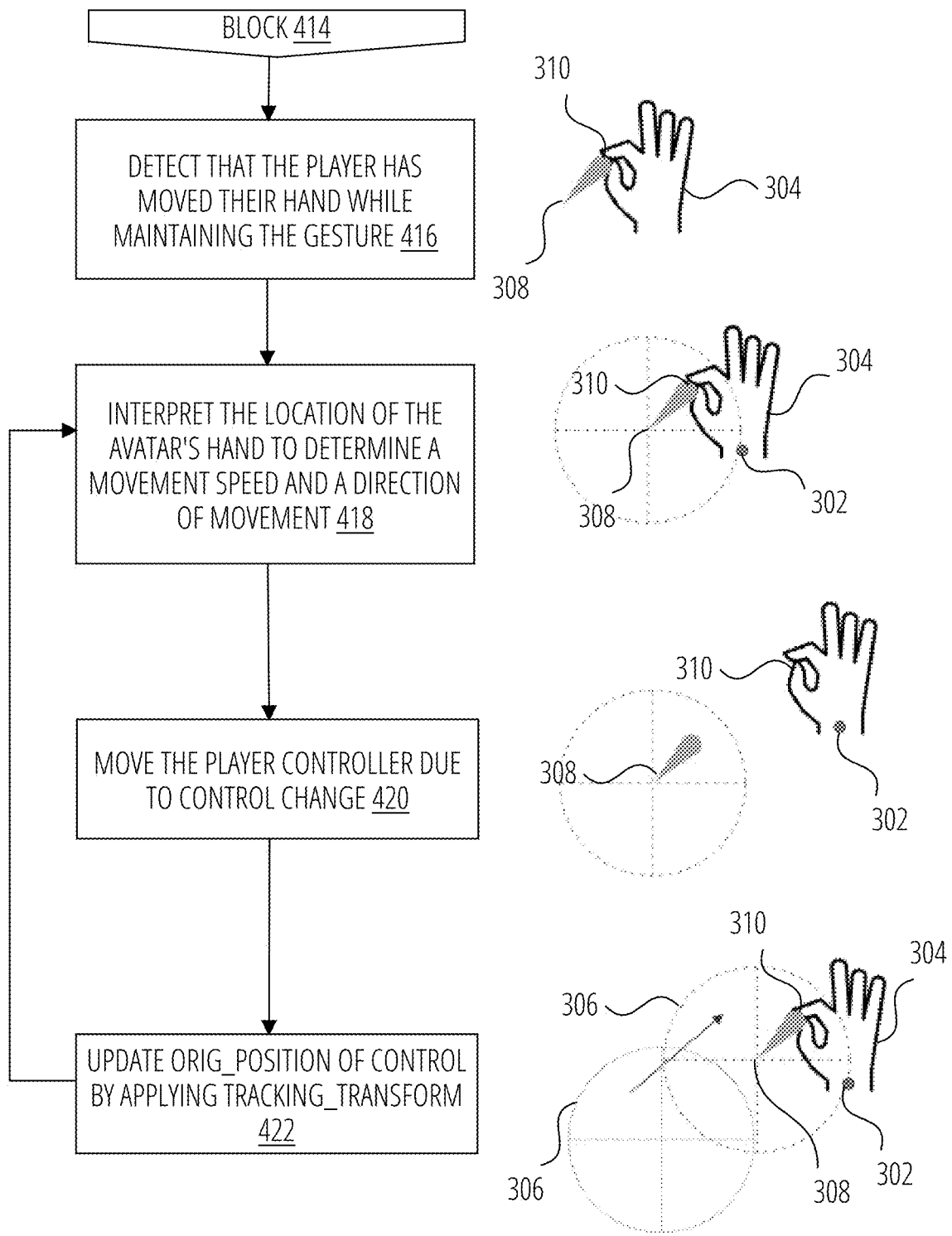
FIG. 4B illustrates an example routine for controlling locomotion of an avatar through finger tracking in accordance with some aspects of the present technology.

FIG. 4B illustrates an example routine for controlling locomotion, in particular directional locomotion using a directional virtual controller, of an avatar through finger tracking. While FIG. 4B is shown as continuing from the routine illustrated in FIG. 4A, it should be appreciated that the routine of FIG. 4B can be performed independently of the routine in FIG. 4A. FIG. 4B might still rely on a transform from room space to world space, but the transform does not need to be created as exemplified in FIG. 4A. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The virtual controller can be presented in the virtual world associated with the player's avatar. As addressed above, only the center of the virtual controller might be visible. The center of the virtual controller can appear like a joystick such that the player can move their hands to control their avatar's hands to push the joystick in a certain direction. While maintaining the pinch gesture or other gesture used to invoke the virtual controller, the player can move their hand to control the movement of their avatar.

As addressed above, one type of virtual controller is a directional controller that can be used to provide inputs to move the avatar forward, backward, and to strafe right or left, and another type of virtual controller is a rotational controller that can be used to provide movements to cause the avatar to rotate right or left. In some embodiments, the directional controller is associated with a left hand and the rotational controller is associated with the right hand. In some embodiments, the controllers can be in the opposite hands (e.g., directional controller in right hand), or in the same hands where different gestures are used to distinguish between the type of motion. In some embodiments, a controller could be controlled by other parts of a player's body (feet or hips, etc.) by tracking those body parts in room space.

As addressed above, the routine includes detecting the movement of the player's hand associated with the directional controller, while the hand maintains the gesture at block 416. The client device 106 can detect the movement of the player's hand and that the hand continues to maintain the gesture, and can report the position of the player's hand in room space over time to the VR tracking service 114 of the client 104. The client 104 can use the previously determined transforms to locate the avatar's hand in the world space.

The routine further includes interpreting the location of the player's hand to determine a movement speed and a direction of movement for the avatar at block 418. For example, the client 104 can determine an offset, in room space, of the player's hand from the initial pinch point in the world space and interpret that offset as a movement speed. The further the player's hand is located from the initial pinch point in world space, the greater the movement speed of the avatar. In some embodiments, the client 104 can utilize a function to determine a velocity of movement with a distance as a variable.

The velocity of movement controlled by a directional virtual controller can be in any direction. The client 104 can determine the direction of movement by determining a vector from the initial pinch point in the world space to the location of the player's hand in room space to resolve a direction of movement. In the instance of a directional controller, the movement of the avatar can be in the direction of the vector.

According, the client 104 can determine a direction and a speed of movement for the avatar. The direction of the movement is in the direction of the vector from the initial pinch point in the room space to the location of the player's hand in room space, and the speed is a function of the length of the vector (the distance of the initial pinch point in the room space to the location of the player's hand in room space).

As the avatar moves through world space the tracking transform is utilized to update the orig_position (the center of the virtual controller) to maintain its relative position to the character root to which the avatar is mapped. The routine includes moving the character root based on the inputs to the virtual controller at block 418, and updating the position of the center of the virtual controller using the tracking transform to maintain its relative position to the character root to which the avatar is mapped at block 422. For example, the client 104 can move the character root based on the inputs into the virtual controller and can update the position of the center of the virtual controller using the tracking transform to maintain its relative position to the character root to which the avatar is mapped.

Inputs to cause the avatar to continue to move will be applied until the player returns their hands to the original position in the room space at which the virtual controller was instantiated (the initial pinch point), or the player discontinues the gesture used to instantiate the virtual controller.

As described above, the inputs for moving the avatar are taken from the player's movements in room space. The virtual controller is displayed in the avatar's hand in world space to provide an intuitive feedback mechanism to demonstrate that the client 104 has properly interpreted the inputs (in addition to the movement of the avatar in world space). The fact that the inputs for moving the avatar are taken from the player's movements in room space provides a benefit that the inputs given to the avatar are provided in human scale. The avatar could be tiny or gigantic in the world space. Therefore, same amount of movement in room space results in the same amount of motion for an avatar of any size, but the display of the virtual joystick can be at whatever scale the avatar is.

Figure 4C:
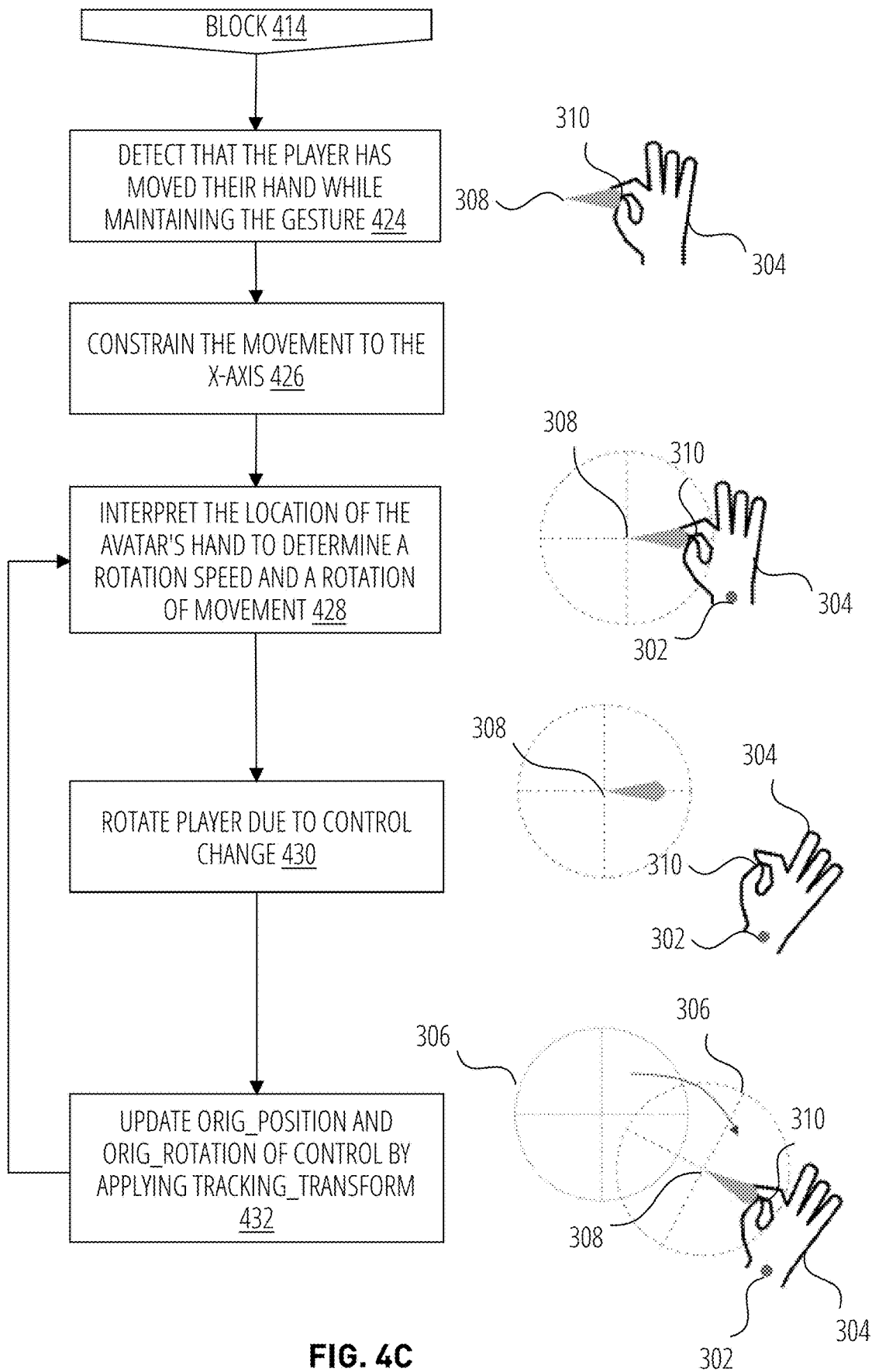
FIG. 4C illustrates an example routine for controlling locomotion of an avatar through finger tracking in accordance with some aspects of the present technology.

FIG. 4C illustrates an example routine for controlling locomotion, in particular directional locomotion using a rotational virtual controller, of an avatar through finger tracking. While FIG. 4C is shown as continuing from the routine illustrated in FIG. 4A, it should be appreciated that the routine of FIG. 4C can be performed independently of the routine in FIG. 4A. FIG. 4C might still rely on a transform from room space to world space, but the transform does not need to be created as exemplified in FIG. 4A. Additionally, while FIG. 4B and FIG. 4C are illustrated separately, it should be appreciated that both routines can be performed at the same time and that, in some embodiments, they can be performed by the same hardware or software objects. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The virtual controller can be presented in the virtual world associated with the player's avatar. As addressed above, only the center of the virtual controller might be visible. The center of the virtual controller can appear like a joystick such that the player can move their hands to control their avatar's hands to push the joystick in a certain direction. While maintaining the pinch gesture, or other gesture used to invoke the virtual controller, the player can move their hand to control the movement of their avatar.

As addressed above, one type of virtual controller is a directional controller that can be used to provide inputs to move the avatar forward, backward, and to strafe right or left, and another type of virtual controller is a rotational controller that can be used to provide movements to cause the avatar to rotate right or left. In some embodiments, the directional controller is associated with the left hand and the rotational controller is associated with the right hand. In some embodiments, the controllers can be in the opposite hands (e.g., directional controller in right hand), or in the same hands where different gestures are used to distinguish between the type of motion. In some embodiments, a controller could be controlled by other parts of a player's body (feet or hips, etc.) by tracking those body parts in room space.

As addressed above, the routine includes detecting the movement of the player's hand associated with the rotational controller while the hand maintains the gesture at block 424. The client device 106 can detect the movement of the player's hand and that the hand continues to maintain the gesture, and can report the position of the player's hand in room space over time to the VR tracking service 114 of the client 104. The client 104 can use the previously determined transforms to locate the avatar's hand in the world space.

The routine further includes constraining the movement of the joystick to the x-axis at block 426. For example, the client 104 can determine that the movement of the player's hand (while maintaining the gesture) is to the positive or negative side of the origin point of the virtual controller (the initial pinch point in room space). Although the player may have moved their hand and correspondingly moved the avatar's hand in both an X and Y direction, the client 104 can constrain the movement of the joystick to the X-axis only. In some embodiments, the rotational controller can be constrained to other axes (e.g., the rotation could also be to pitch up and down based on the z-axis). In some embodiments, the rotational virtual controller might not be constrained to any axis and might permit 6-degrees of freedom of rotation.

The routine further includes interpreting the location of the player's hand to determine a rotation speed and a rotation of movement at block 428. For example, the client 104 can determine an offset, in room space, of the player's hand from the initial pinch point in the room space, and interpret that offset in the x-axis as a rotation speed. The further player's hand is located from the initial pinch point in room space along the x-axis, the greater the rotation speed of the avatar. In some embodiments, the client 104 can utilize a function to determine a velocity of rotation with a distance as a variable.

The velocity of rotation controlled by the rotational virtual controller can be in any direction. Although the example given herein is to rotate left and right based on the x-axis, the client 104 can determine the direction of movement by determining a vector from the initial pinch point in the world space to the location of the player's hand in room space to resolve a direction of movement—although, as addressed above the rotational controller is limited to the X-axis component on the vector. In the instance of a rotational controller, the movement of the avatar can be in the direction of the vector along the X-axis (i.e., rotation right or left).

Accordingly, the client 104 can determine a direction and a speed of movement for the avatar. The direction of the movement is in the direction of the vector along the X-axis from the initial pinch point in the room space to the location of the player's hand in room space, and the speed is a function of the length of the vector along the X-axis (the distance of the initial pinch point in the world space to the location of the player's hand in room space).

As the avatar rotates in world space, the tracking transform is utilized to update the orig_position (the center of the virtual controller) to maintain its relative position to the character root to which the avatar is mapped. The routine includes rotating the character root based on the virtual controller inputs at block 430, and updating the position of the center of the virtual controller using the tracking transform to maintain its relative position to the character root to which the avatar is mapped at block 432. For example, the client 104 can rotate the character root based on the inputs to the virtual controller given by moving the player's hands in room space and can update the position of the center of the virtual controller using the tracking transform to maintain its relative position to the character root to which the avatar is mapped.

Inputs to cause the avatar to continue to move will be applied until the player returns their hands to the original position in the room space at which the virtual controller was instantiated, or the player discontinues the gesture used to instantiate the virtual controller.

As described above, the inputs for moving the avatar are taken from the player's movements in room space. The virtual controller is displayed in the avatar's hand in world space to provide an intuitive feedback mechanism to demonstrate that the client 104 has properly interpreted the inputs (in addition to the movement of the avatar in world space). The fact that the inputs for moving the avatar are taken from the player's movements in room space provides a benefit that the inputs given to the avatar are provided in human scale. The avatar could be tiny or gigantic in the world space. Therefore, same amount of movement in room space results in the same amount of motion for an avatar of any size, but the display of the virtual joystick can be at whatever scale the avatar is.

Figure 5:
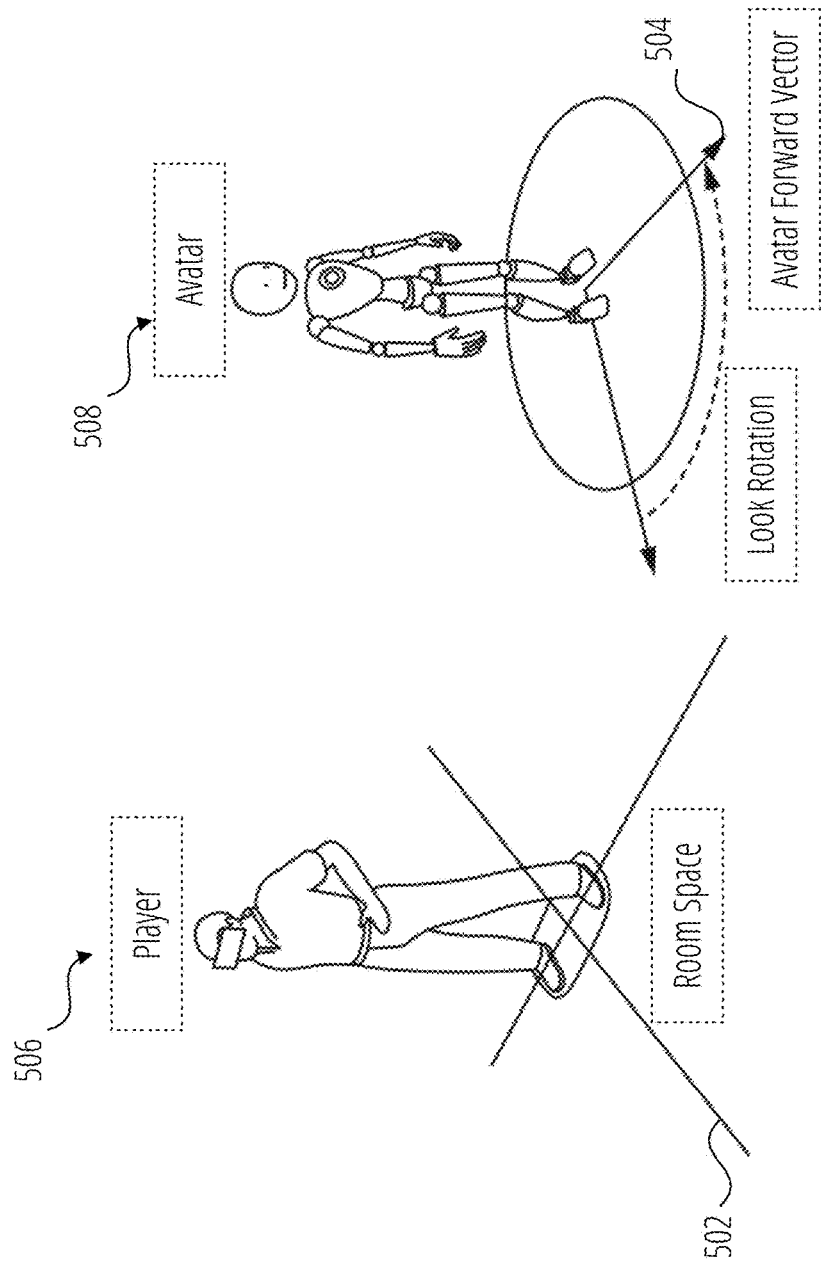
FIG. 5 illustrates the relationship between a player in a room space and an avatar in world space in accordance with some aspects of the present technology.

FIG. 5 illustrates the relationship between a player in a room space 506 and an avatar in world space 508. An area around the player in the room space 506 is the area in which the player's movements are tracked. As the player moves their hands throughout the room space, a hand and finger tracking client device 106 can record positions and orientations of the player's hands and fingers and provide inputs indicating recognized gestures and locations of those gestures to the client 104 rendering the virtual world and the avatar.

The client 104 stores the world position in world space 508 transformed using the transform addressed above into room space 506. The client 104 also stores the player's current forward vector 502 in world space 508 and transforms that into a "Look Rotation" based off an ORIG_ROTATION 504. As described herein, one or more transforms can be used to map the location of the player's hands and in the world space 508 to a relative position of the character root in the room space 506.

Figure 6:
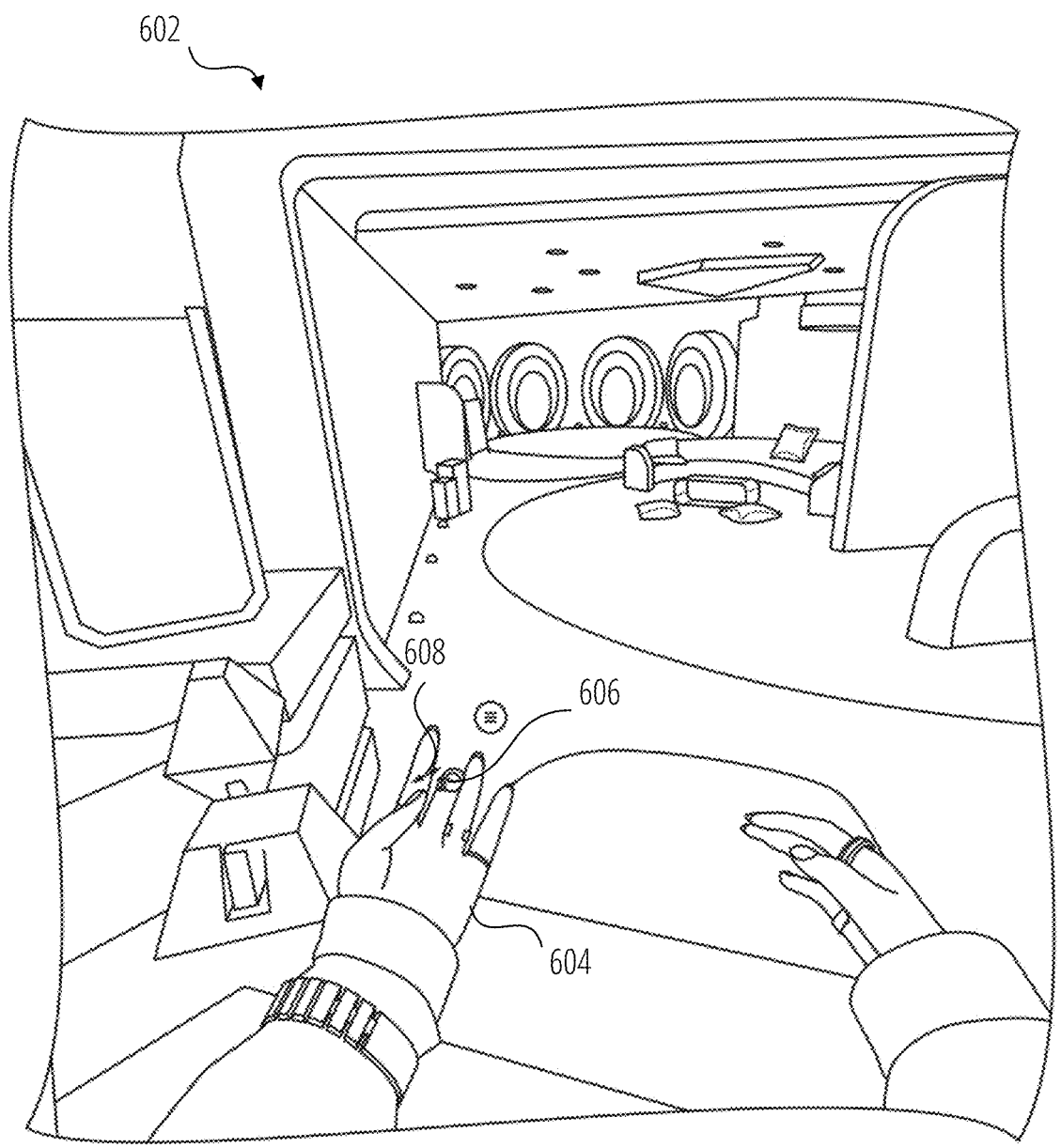
FIG. 6 illustrates an example of an avatar performing a pinching gesture with its left hand to instantiate a virtual controller in accordance with some aspects of the present technology.

FIG. 6 illustrates an example of an avatar performing a pinching gesture with its left hand to instantiate a virtual controller.

FIG. 6 illustrates an example world space 602 as viewed in first person by a player controlling an avatar. The avatar's left hand 604 is illustrated in making a pinch pose with its ring finger and thumb to mirror the same pose made by the player's left hand in room space. As a result of the detected gesture, client 104 has instantiated a virtual controller indicated by joystick 606. Joystick 606 is indicated by the dot shown near the intersection of the tip of the avatar's thumb and the tip of the avatar's ring finger. Additionally, the client 104 has rendered a directional arrow 608 to indicate to the player to move the avatar's left hand 604 forward or backward, which will control the avatar to move forward or backward. Although the directional arrow 608 only indicates moving forward or backward, the hand can move in any direction, and movements of the left hand can be used to provide inputs to move the avatar forward, backward, and strafe right or left.

Figure 7:
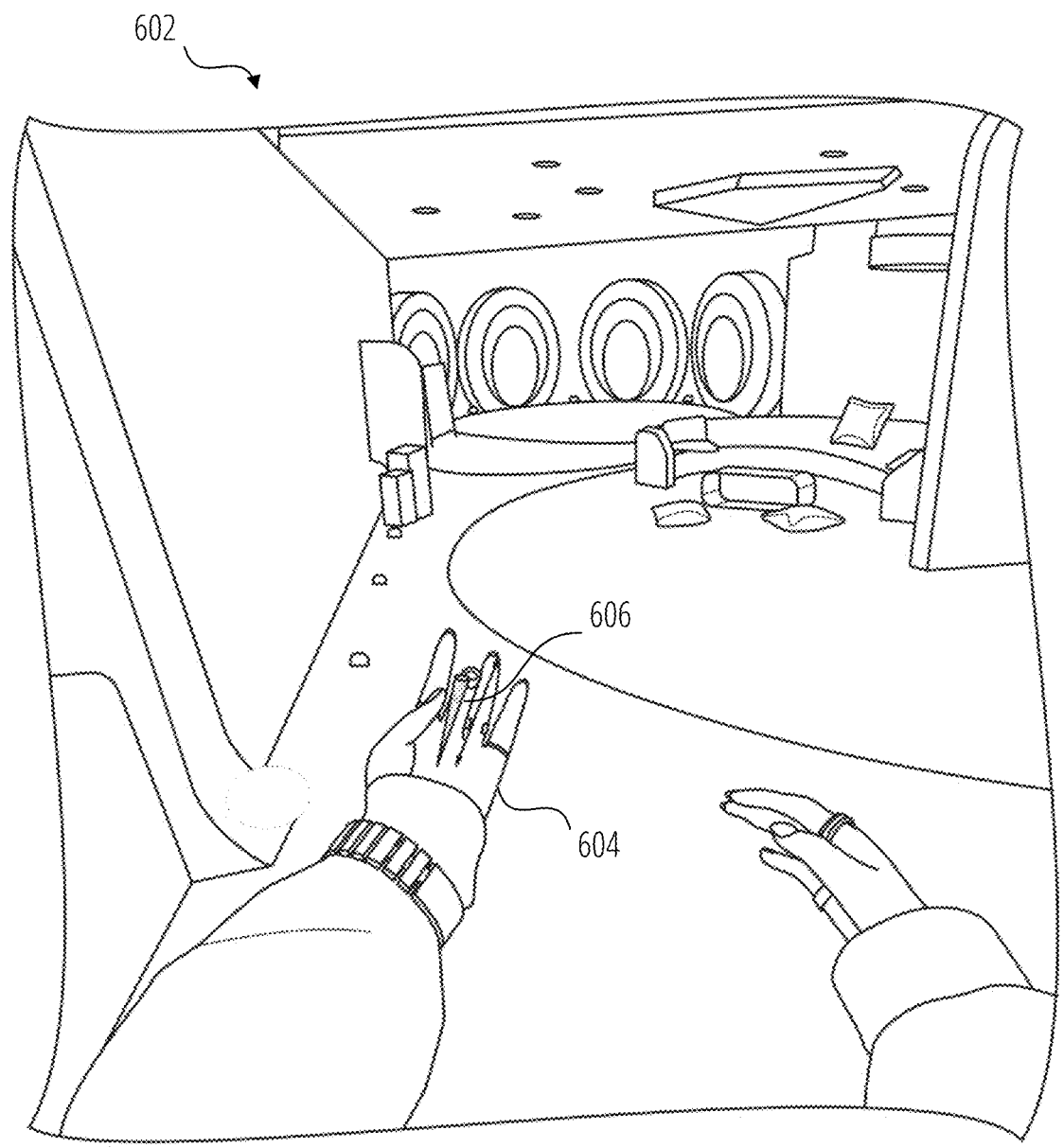
FIG. 7 illustrates an example of using a virtual controller to cause an avatar to walk forward in accordance with some aspects of the present technology.

FIG. 7 illustrates an example of using a virtual controller to cause an avatar to walk forward.

For example, a player has provided an input causing the avatar's left hand 604 to move slightly forward as indicated by the enlarged joystick 606 from the controller's initial position to the controller's current position. The avatar can walk in the direction of a vector originating at the controller's initial position and toward the direction of the controller's current position. The avatar can walk at a velocity that is relative to, or proportional to, the distance between the controller's initial position and the controller's current position. As the avatar moves throughout the virtual world, the controller's initial position will remain in the same relative position with respect to the character root.

FIG. 7 illustrates the world space 602 after the avatar has moved forward in the world space 602 in response to the input given to the virtual controller.

Figure 8:
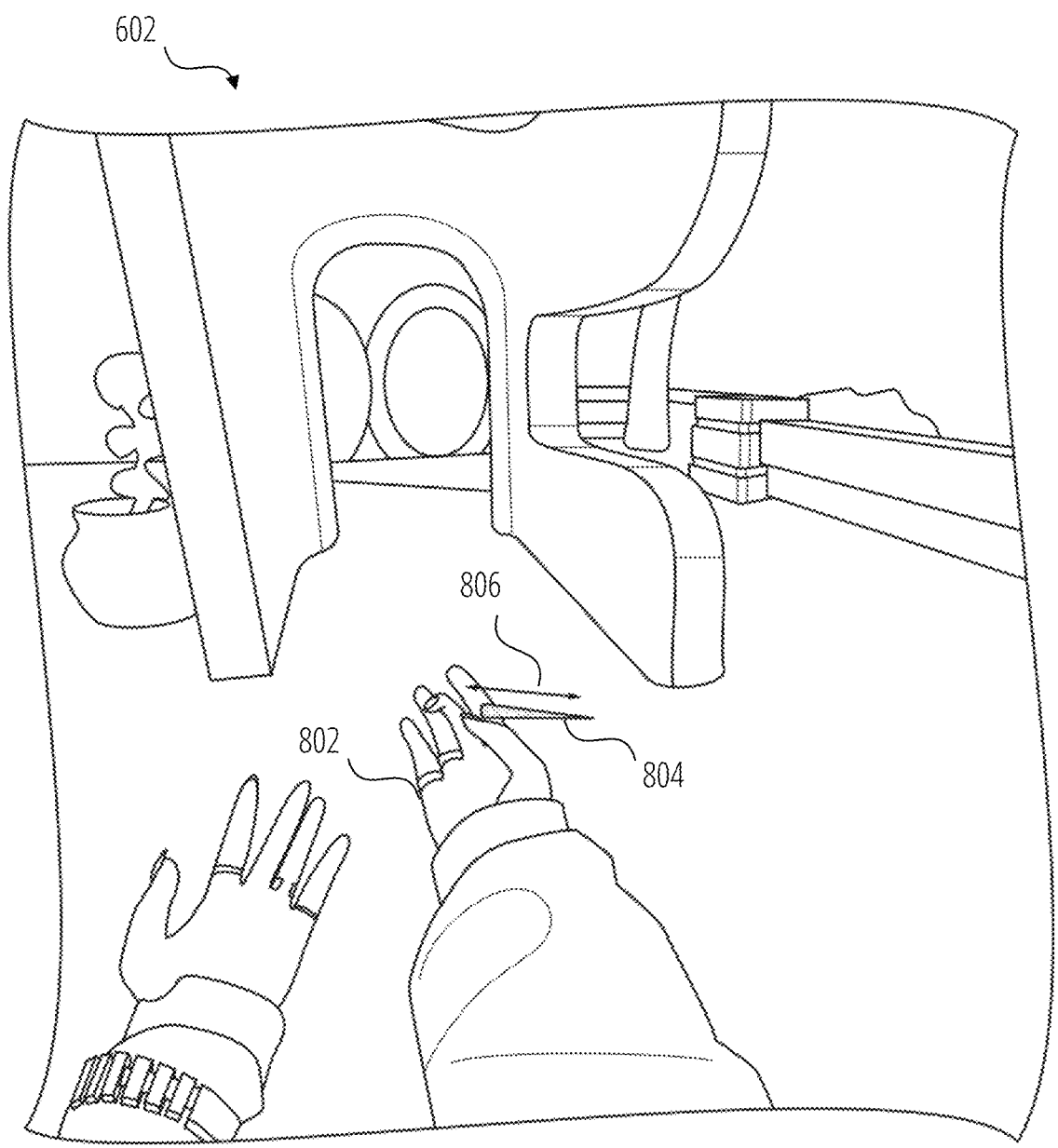
FIG. 8 illustrates an example of using a virtual controller to cause an avatar to rotate toward the left in accordance with some aspects of the present technology.

FIG. 8 illustrates an example of using a virtual controller to cause an avatar to rotate toward the left.

For example, after a player had created the pinch gesture to instantiate the virtual controller, the player has provided an input causing an avatar to move its hand leftward as indicated by the enlarged joystick 804 from the controller's initial position to the controller's current position. In some embodiments, the joystick 804 of the virtual controller can be limited to the right and left direction when the virtual controller is configured to provide commands to rotate the avatar right and left. The avatar can rotate in the direction of a vector originating at the controller's initial position and toward the direction of the controller's current position. The avatar can rotate at a velocity relative to, or proportional to, the distance between the controller's initial position and the controller's current position. As the avatar rotates throughout the virtual world, the controller's initial position remains in the same relative position with respect to the character root.

Figure 9:
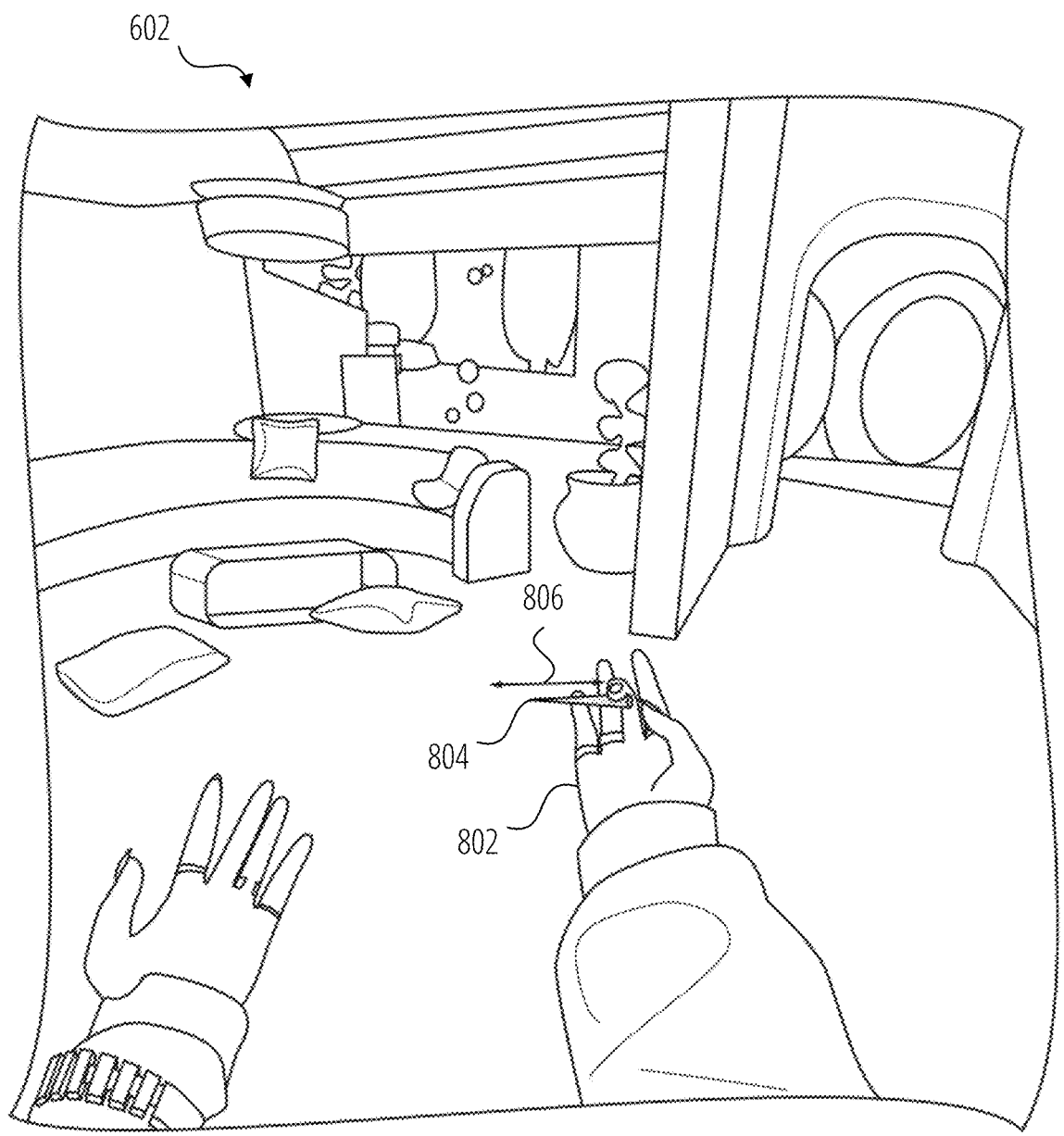
FIG. 9 illustrates an example of using a virtual controller to cause an avatar to rotate toward the right in accordance with some aspects of the present technology.

FIG. 9 illustrates an example of using a virtual controller to cause an avatar to rotate toward the right in the inverse movement to that illustrated in FIG. 8. FIG. 9 illustrates the world space 602 after the avatar has moved right in the world space 602 in response to the input given to the virtual controller.

Figure 10:
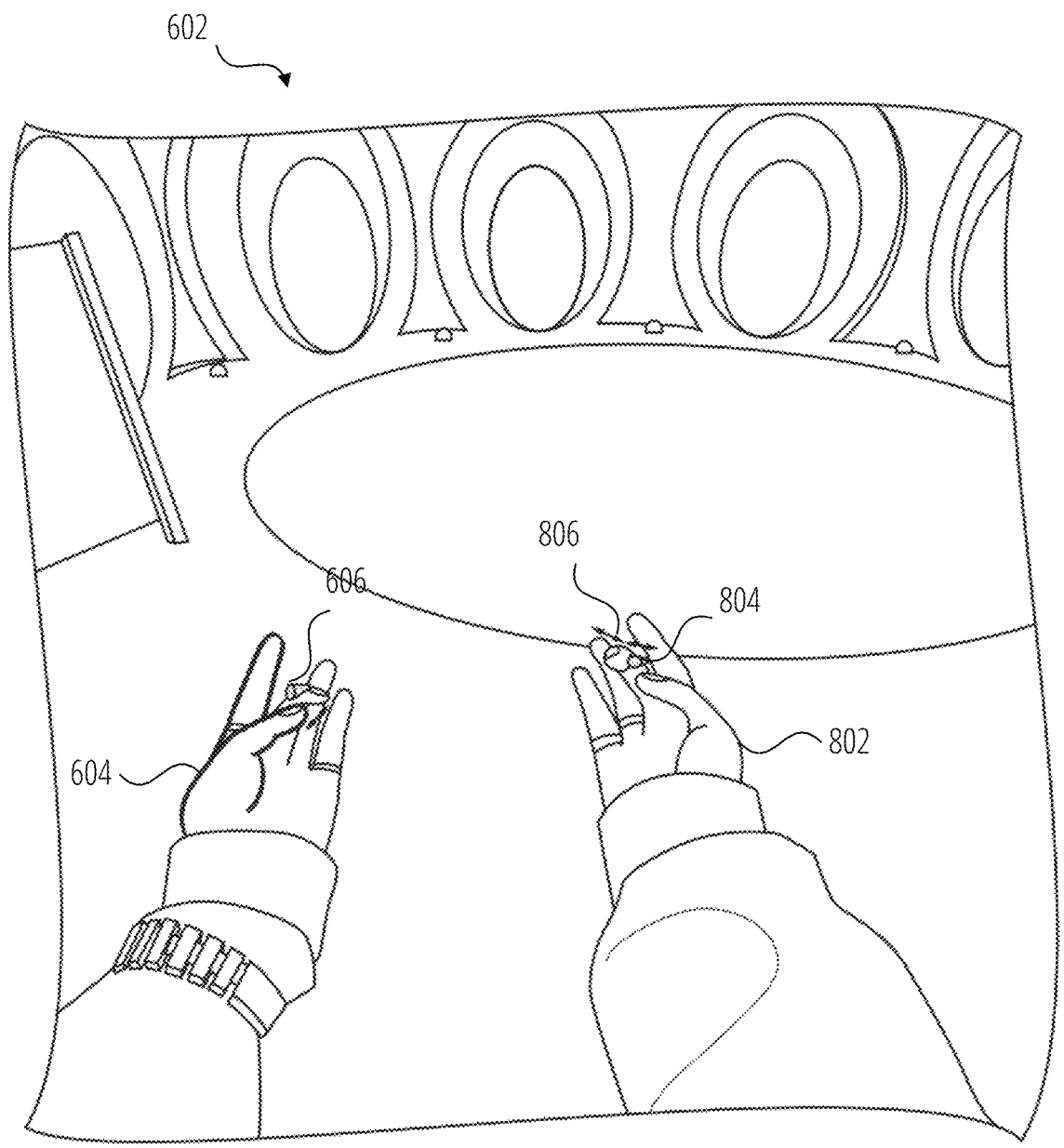
FIG. 10 illustrates an avatar performing a pinching gesture with its left hand and right hand in accordance with some aspects of the present technology.

FIG. 10 illustrates an avatar performing a pinching gesture simultaneously with its left hand 604 and right hand 802. A virtual controller has been instantiated in each hand as indicated by the joystick 606 and joystick 804 shown in the left hand 604 and right hand 802, respectively. In some embodiments, movements of the left hand 604 can be used to provide inputs to move the avatar forward, backward, and to strafe right or left, while movements of the right hand 802 can be used to provide movements to cause the avatar to rotate right or left. Inputs can be given to both virtual controllers at the same time.

Figure 11:
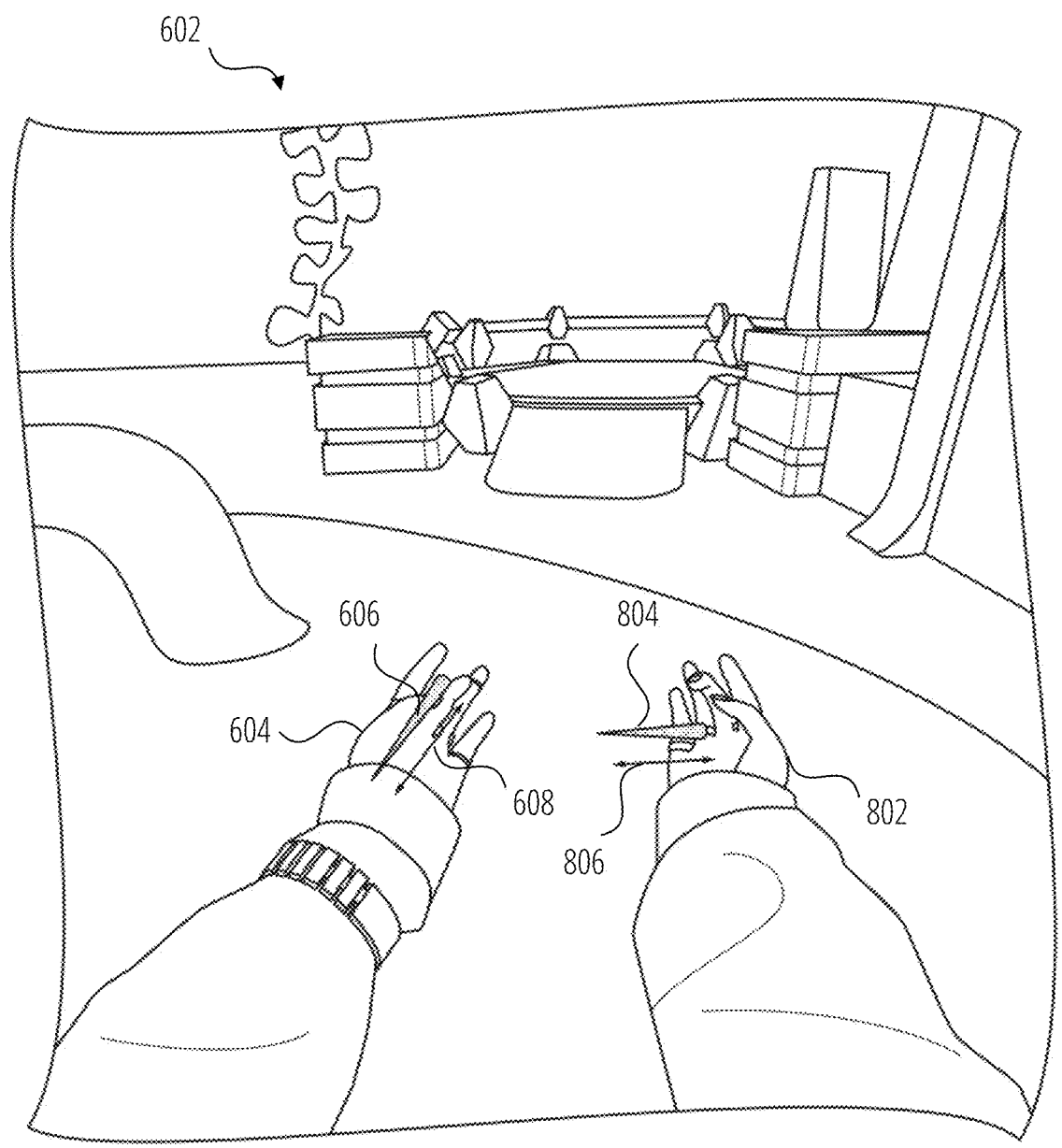
FIG. 11 illustrates an example of using a virtual controller in the left hand and a virtual controller in the right hand to cause the avatar to walk forward and rotate to the right in accordance with some aspects of the present technology.

FIG. 11 illustrates an example of using a virtual controller in the left hand 604 and a virtual controller in the right hand 802 simultaneously to cause the avatar to walk forward and rotate to the right as described above.

The present technology can be used with many different motions and cause more complex commands like jumping and combinations of moves like running and jumping or rotating and strafing. The present technology can also be used to create ports such as for teleportation or holographic portation (holoport) to move avatars from one location to another or one world to another.

The present technology can also be used to control adaptive technologies or can be used in association with adaptive technologies. For example, some players of virtual reality can get motion sickness, and adaptive technologies can change how motion is animated and perceived to alleviate motion sickness. In another example, the present technology can be used to change a horizon of view to permit the virtual reality experience for those laying in a bed. In another example, the present technology can be used to maintain the location of hands used in sign language.

The present technology can also be used to create avatar effects such as to allow an avatar to change form, or to allow an avatar to scale up or down, etc. Other effects can be mute and unmute, enable expressions and emotes, etc.

In some embodiments, each image of FIG. 6 through FIG. 11 can be considered as frames in a sequence in an animation.

Figure 12:
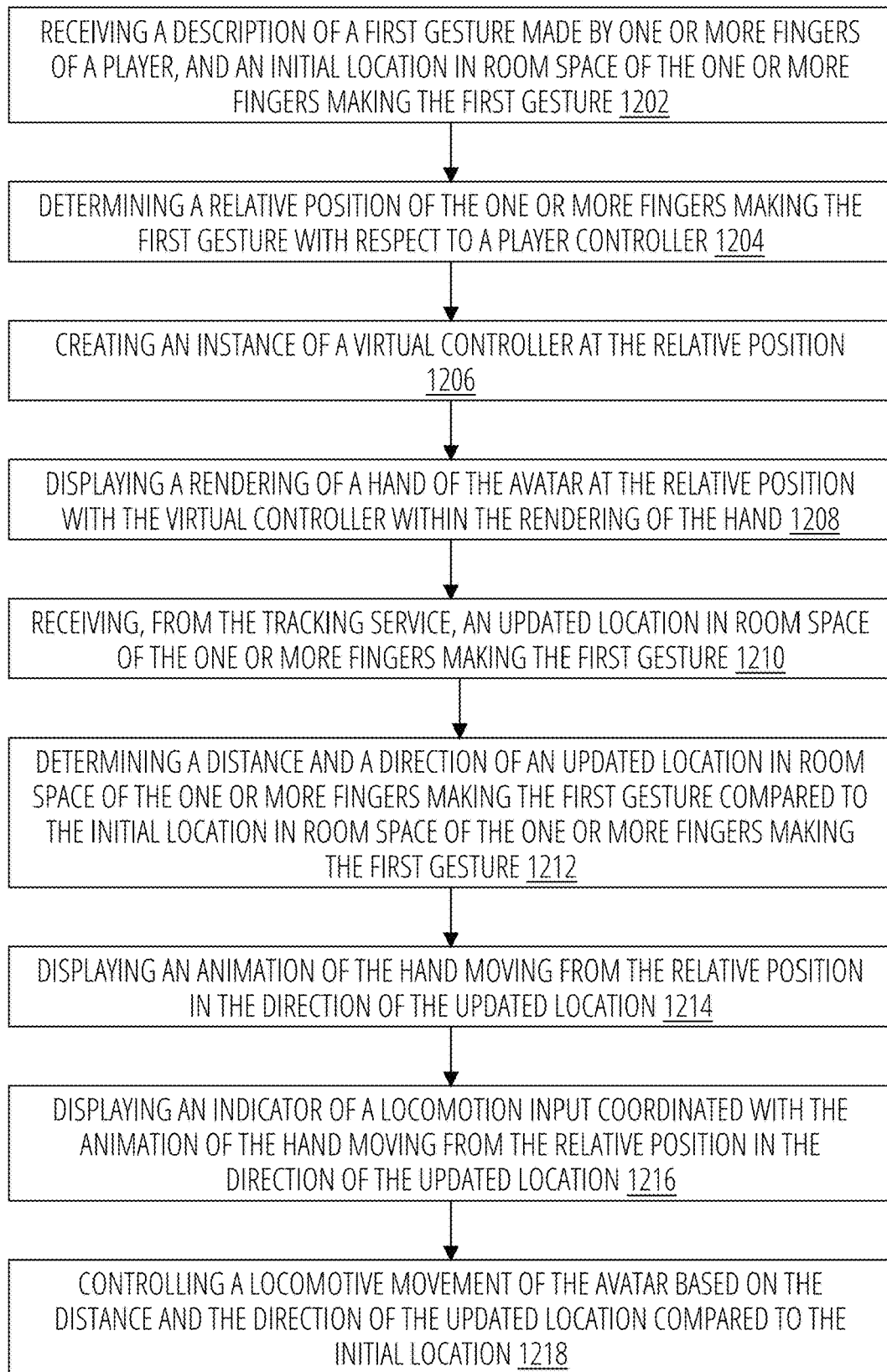
FIG. 12 illustrates an example routine for controlling locomotion of an avatar through finger tracking in accordance with some aspects of the present technology.

FIG. 12 illustrates an example routine for controlling locomotion of an avatar through finger tracking. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving a description of a first gesture made by one or more fingers of a player, and an initial location in space of the one or more fingers making the first gesture at block 1202. For example, the client 104 illustrated in FIG. 1 may receive, from a tracking service of the client device 106, a description of a first gesture made by one or more fingers of a player, and an initial location in room space of the one or more fingers making the first gesture.

According to some examples, the method includes determining a relative position of the one or more fingers making the first gesture with respect to a pinch initiation point detected in a room space at block 1204. For example, the client 104 illustrated in FIG. 1 may determine a relative position of the one or more fingers making the first gesture with respect to a pinch initiation point detected in a room space.

According to some examples, the method includes creating an instance of a virtual controller at an offset position relative to a character root at block 1206. For example, the client 104 illustrated in FIG. 1 may create an instance of a virtual controller at the offset position relative to the character root. The creating the instance of the virtual controller at the offset position further includes locating a center of the virtual controller at the offset position, and displaying a virtual controller user interface at the offset position.

According to some examples, the method includes displaying a rendering of a hand of the avatar at the offset position with a joystick of the virtual controller within the rendering of the hand at block 1208. For example, the client 104 illustrated in FIG. 1 may display a rendering of a hand of the avatar at the offset position with a joystick of the virtual controller within the rendering of the hand.

According to some examples, the method includes receiving, from the tracking service, an updated location in room space of the one or more fingers making the first gesture at block 1210. For example, the client 104 illustrated in FIG. 1 may receive, from the tracking service, an updated location in the room space of the one or more fingers making the first gesture.

According to some examples, the method includes determining a distance and a direction of an updated location in the room space of the one or more fingers making the first gesture compared to the initial location in the room space of the one or more fingers making the first gesture at block 1212. For example, the client 104 illustrated in FIG. 1 may determine a distance and a direction of an updated location in room space of the one or more fingers making the first gesture compared to the initial location in room space of the one or more fingers making the first gesture.

According to some examples, the method includes displaying an animation of the hand moving from the initial position (initial offset positon) in the direction of the updated location (updated offset position) at block 1214. For example, the client 104 illustrated in FIG. 1 may display an animation of the hand moving from the initial position in the direction of the updated location.

According to some examples, the method includes displaying an indicator of a locomotion input coordinated with the animation of the hand moving from the initial offset position in the direction of the updated location at block 1216. For example, the client 104 illustrated in FIG. 1 may display an indicator of a locomotion input coordinated with the animation of the hand moving from the initial position in the direction of the updated location. The indicator of the locomotion input can be an enlarged joystick as addressed above.

According to some examples, the method includes controlling a locomotive movement of the avatar based on the distance and the direction of the current position of the player's hand in room space compared to the initial position of the player's hand in room space at block 1218. For example, the client 104 illustrated in FIG. 1 may control a locomotive movement of the avatar based on the distance and the direction of the current position of the player's hand in room space compared to the initial location of the player's hand. In this example, the instance of the virtual controller is a linear motion controller. The locomotive movement of the avatar is in a linear direction of a vector originating at the initial location of the player's hand pointing towards the updated location of the player's hand. The locomotive movement of the avatar is at a velocity that corresponds to the distance between the initial location of the player's hand and the updated location of the player's hand, wherein a greater distance between the initial location and the updated location corresponds to a greater velocity than a lesser distance between the initial location and the updated location.

When the instance of the virtual controller is a rotational motion controller. The locomotive movement of the avatar is in a rotational direction of a vector originating at the initial location of the player's hand in room space pointing towards the updated location of the player's hand, wherein the locomotive movement of the avatar is at a velocity that corresponds to the distance between the initial location of the player's hand and the updated location of the player's hand, wherein a greater distance between the initial location and the updated location corresponds to a greater velocity than a lesser distance between the initial location and the updated location.

While the virtual controller has been illustrated and addressed as a virtual joystick-type controller throughout this description, persons of ordinary skill in the art will appreciate that the virtual controller can be of other types. The virtual controller can be represented with movement indicators, virtual buttons, or other UI objects. A joystick is just one example of a virtual controller. Additionally, it is possible to utilize the present technology without representing the virtual controller. Inputs from gestures can be provided to affect gameplay without displaying the virtual controller.

While the present description has focused on two types of locomotion controllers (i.e., directional controller and rotational controllers), it will be appreciated by those skilled in the relevant arts that the virtual controller and/or the use of gestures to provide inputs to control an avatar or game play is not limited to locomotion. For example, other inputs that could be provided by a player making a gesture include to grab or interact with an object, to open or close a menu, to mute or un-mute a microphone, to cancel an input or drop an object, to jump, or to provide a gesture to lock out other gestures from being interpreted as a command to do something other than position an avatar's hand and fingers.

While the present description has defined a pinch gesture as being effective to instantiate the virtual controller, it should be appreciated that other gestures can be defined to instantiate this or other functions. That is another gesture could be used to instantiate the locomotion controller, and the particular pinch gesture could be remapped to another function.

Some example functions and mappings to gestures can be for example:
1. Interact/Grab—Left/Right Thumb and Index pinch, palm facing away from user
2. Open/Close Quick Menu (e.g., quick menu 202)—Left Thumb and Index pinch while palm facing towards user
3. Movement Locomotion—Left Thumb and Middle pinch and hold
4. Mute/Un-mute Microphone—Left Thumb and Ring pinch and hold
5. Cancel/Drop—Left/Right Thumb and Pinky pinch
6. Open/Close Oculus Menu—Right Thumb and Index hold while palm facing towards user
7. Rotation Locomotion—Right Thumb and Middle pinch and hold
8. Jump—Right Thumb and Ring pinch
9. Gesture Lock—Left thumb and pinky touch to lock gestures, preventing all locomotion actions until the Gesture Lock (touch left thumb and pinky together) is performed again.

As noted above, these gestures may be re-bindable to other controls.

Many of the gestures indicated above can be performed simultaneously to effect multiple functions at the same time. For example, directional movement, rotational movement, and jumps can all be performed at the same time.

The gesture lock gesture can be particularly useful in a gameplay environment wherein a player might control an avatar in a conversational environment as well as direct the avatar to take other actions. As many people "talk with their hands", and indeed some hearing-impaired players might literally use sign language to communicate, it can be desired to prevent gestures from being mapped to other functions. Thereby, when the gesture lock is enabled, a player can control an avatar during conversation to make various hand gestures without causing the avatar to move or mute or open a menu, etc. Once the player has completed a conversation or otherwise would like to reenable the mapping of gestures to functions, the player can remove the gesture lock.

Figure 13:
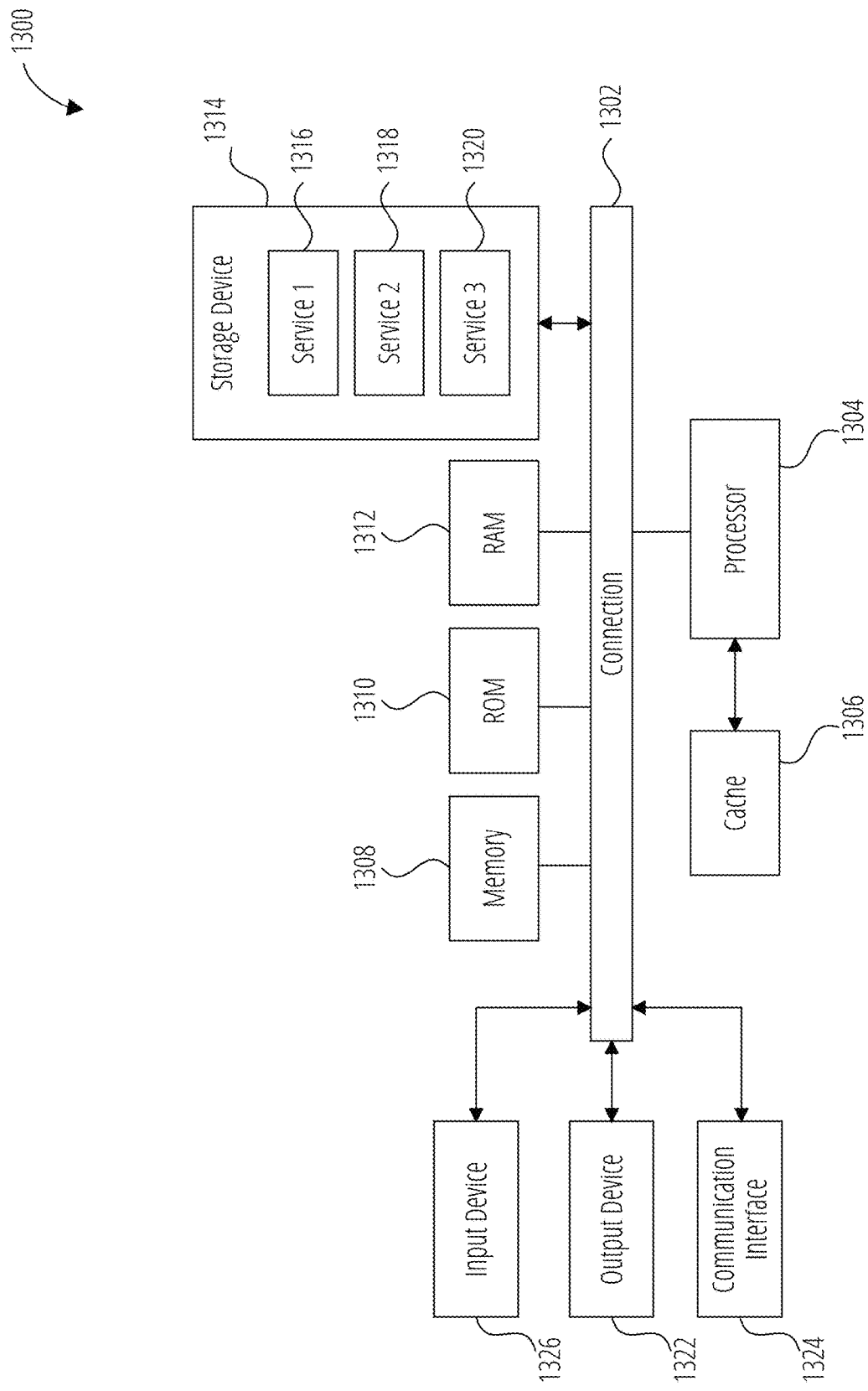
FIG. 13 shows an example of a system for implementing certain aspects of the present technology.

FIG. 13 shows an example of computing system 1300, which can be for example any computing device making up client device 106 or web services 110 or networking services 112, or any component thereof in which the components of the system are in communication with each other using connection 1302. Connection 1302 can be a physical connection via a bus, or a direct connection into processor 1304, such as in a chipset architecture. Connection 1302 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1300 includes at least one processing unit (CPU or processor) 1304 and connection 1302 that couples various system components including system memory 1308, such as read-only memory (ROM) 1310 and random access memory (RAM) 1312 to processor 1304. Computing system 1300 can include a cache of high-speed memory 1306 connected directly with, in close proximity to, or integrated as part of processor 1304.

Processor 1304 can include any general purpose processor and a hardware service or software service, such as services 1316, 1318, and 1320 stored in storage device 1314, configured to control processor 1304 as well as a special-purpose processor where software instructions are incorporated into the actual processor design. Processor 1304 may essentially be a completely self-contained computing system, containing multiple cores or processors, a bus, memory controller, cache, etc. A multi-core processor may be symmetric or asymmetric.

To enable player interaction, computing system 1300 includes an input device 1326, which can represent any number of input mechanisms, such as a microphone for speech, a touch-sensitive screen for gesture or graphical input, keyboard, mouse, motion input, speech, etc. Computing system 1300 can also include output device 1322, which can be one or more of a number of output mechanisms known to those of skill in the art. In some instances, multimodal systems can enable a player to provide multiple types of input/output to communicate with computing system 1300. Computing system 1300 can include communication interface 1324, which can generally govern and manage the player input and system output. There is no restriction on operating on any particular hardware arrangement, and therefore the basic features here may easily be substituted for improved hardware or firmware arrangements as they are developed.

Storage device 1314 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1314 can include software services, servers, services, etc., that when the code that defines such software is executed by the processor 1304, it causes the system to perform a function. In some embodiments, a hardware service that performs a particular function can include the software component stored in a computer-readable medium in connection with the necessary hardware components, such as processor 1304, connection 1302, output device 1322, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments of present technology can further be understood from the following clauses:

Clause 1. A method for controlling locomotion of an avatar through finger tracking, the method comprising: receiving, from a tracking service, a description of a first gesture made by one or more fingers of a player, and an initial location in space of the one or more fingers making the first gesture; determining a relative position of the one or more fingers making the first gesture with respect to a character root, wherein the character root is a volume within a virtual world to which the avatar representing the player is mapped; and creating an instance of a virtual controller at the relative position.

Clause 2. The method of clause 1, wherein the creating the instance of the virtual controller at the relative position further comprises: locating a center of the virtual controller at the relative position; and displaying a virtual controller user interface at the relative position.

Clause 3. The method of any of clauses 1-2, the method comprising: displaying a rendering of a hand of the avatar at the relative position with the virtual controller within the rendering of the hand; determining a distance and a direction of an updated location in space of the one or more fingers making the first gesture compared to the initial location in space of the one or more fingers making the first gesture; displaying an animation of the hand moving from the relative position in the direction of the updated location; and displaying an indicator of a locomotion input coordinated with the animation of the hand moving from the relative position in the direction of the updated location.

Clause 4. The method of any of clauses 1-3, further comprising: receiving, from the tracking service, an updated location in space of the one or more fingers making the first gesture; determining a distance and a direction of the updated location in space of the one or more fingers making the first gesture compared to the initial location in space of the one or more fingers making the first gesture; controlling a locomotive movement of the avatar based on the distance and the direction of the updated location compared to the initial location.

Clause 5. The method of any of clauses 1-4, wherein the instance of the virtual controller is a linear motion controller, wherein the locomotive movement of the avatar is in a linear direction of a vector originating at the initial location pointing towards the updated location.

Clause 6. The method of any of clauses 1-5, wherein the instance of the virtual controller is a linear motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

Clause 7. The method of any of clauses 1-6, wherein the instance of the virtual controller is a rotational motion controller, wherein the locomotive movement of the avatar is in a rotational direction of a vector originating at the initial location pointing towards the updated location.

Clause 8. The method of any of clauses 1-7, wherein the instance of the virtual controller is a rotational motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

Clause 9. A computing system comprising: a processor; and a memory storing instructions that, when executed by the processor, configure the system to perform the method in of any of clauses 1-8.

Clause 10. A non-transitory computer-readable storage medium comprising instructions that when executed by at least one processor, cause the at least one processor to the method in of any of clauses 1-8.

What is claimed is:

1. A method for controlling locomotion of an avatar through finger tracking, the method comprising:
   receiving, from a tracking service, a description of a first gesture made by one or more fingers of a player in a room space, and an initial location in the room space of the one or more fingers making the first gesture;
   determining a relative position of the one or more fingers in the room space making the first gesture with respect to a character root in a world space, wherein the character root is a volume within a virtual world to which the avatar representing the player is mapped;
   creating an instance of a virtual controller at the relative position; and
   controlling a locomotive movement of the avatar based on an updated location in space of the one or more fingers making the first gesture.

2. The method of claim 1, wherein the creating the instance of the virtual controller at the relative position further comprises:
   locating a center of the virtual controller at the relative position; and
   displaying a virtual controller user interface at the relative position.

3. The method of claim 2, the method comprising:
   displaying a rendering of a hand of the avatar at the relative position with the virtual controller within the rendering of the hand;
   determining a distance and a direction of the updated location in the room space of the one or more fingers making the first gesture compared to the initial location in the room space of the one or more fingers making the first gesture;
   displaying an animation of the hand of the avatar moving from the relative position in the direction of the updated location; and
   displaying an indicator of a locomotion input coordinated with the animation of the hand moving from the relative position in the direction of the updated location.

4. The method of claim 1, further comprising:
   receiving, from the tracking service, the updated location in the room space of the one or more fingers making the first gesture;
   determining a distance and a direction of the updated location in the room space of the one or more fingers making the first gesture compared to the initial location in the room space of the one or more fingers making the first gesture;
   the controlling of the locomotive movement of the avatar based on the distance and the direction of the updated location compared to the initial location.

5. The method of claim 4, wherein the instance of the virtual controller is a linear motion controller, wherein the locomotive movement of the avatar is in a linear direction of a vector originating at the initial location pointing towards the updated location.

6. The method of claim 4, wherein the instance of the virtual controller is a linear motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

7. The method of claim 4, wherein the instance of the virtual controller is a rotational motion controller, wherein the locomotive movement of the avatar is in a rotational direction of a vector originating at the initial location pointing towards the updated location.

8. The method of claim 4, wherein the instance of the virtual controller is a rotational motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

9. A computing system comprising:
   a processor; and
   a memory storing instructions that, when executed by the processor, configure the system to:
   receive, from a tracking service, a description of a first gesture made by one or more fingers of a player in a room space, and an initial location in the room space of the one or more fingers making the first gesture;
   determine a relative position of the one or more fingers making the first gesture in the room space with respect to a character root in a world space, wherein the character root is a volume within a virtual world to which an avatar representing the player is mapped; and
   control a locomotive movement of the avatar based on an updated location in space of the one or more fingers making the first gesture.

10. The computing system of claim 9, further comprising:
    locate a center of a virtual controller at the relative position; and
    display a virtual controller user interface at the relative position.

11. The computing system of claim 10, wherein the instructions configure the system to:
    display a rendering of a hand of the avatar at the relative position with the virtual controller within the rendering of the hand;
    determine a distance and a direction of an updated location in the room space of the one or more fingers making the first gesture compared to the initial location in the room space of the one or more fingers making the first gesture;

display an animation of the hand moving from the relative position in the world space in the direction of the updated location; and display an indicator of a locomotion input coordinated with the animation of the hand moving from the relative position in the direction of the updated location.

12. The computing system of claim 9, wherein the instructions further configure the system to:
receive, from the tracking service, the updated location in the room space of the one or more fingers making the first gesture;
determine a distance and a direction of the updated location in the room space of the one or more fingers making the first gesture compared to the initial location in the room space of the one or more fingers making the first gesture;
the control of the locomotive movement of the avatar in the world space based on the distance and the direction of the updated location compared to the initial location.

13. The computing system of claim 12, wherein the instance of the virtual controller is a linear motion controller, wherein the locomotive movement of the avatar is in a linear direction of a vector originate at the initial location pointing towards the updated location.

14. The computing system of claim 12, wherein the instance of the virtual controller is a linear motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

15. The computing system of claim 12, wherein the instance of the virtual controller is a rotational motion controller, wherein the locomotive movement of the avatar is in a rotational direction of a vector originate at the initial location pointing towards the updated location.

16. The computing system of claim 12, wherein the instance of the virtual controller is a rotational motion controller, wherein the locomotive movement of the avatar is at a velocity that corresponds to the distance between the initial location and the updated location, wherein a greater distance between the initial location and the updated location corresponds to a greater velocity than a lesser distance between the initial location and the updated location.

17. A non-transitory computer-readable storage medium comprising instructions that when executed by at least one processor, cause the at least one processor to:
receive, from a tracking service, a description of a first gesture made by one or more fingers of a player in a room space, and an initial location in the room space of the one or more fingers making the first gesture;
determine a relative position of the one or more fingers making the first gesture in the room space with respect to a character root in a world space, wherein the character root is a volume within a virtual world to which an avatar representing the player is mapped; and
control a locomotive movement of the avatar based on an updated location in space of the one or more fingers making the first gesture.

18. The computer-readable storage medium of claim 17, wherein the instructions further configure the at least one processor to:
locate a center of a virtual controller at the relative position; and
display a virtual controller user interface at the relative position.

19. The computer-readable storage medium of claim 18, wherein the instructions further configure the at least one processor to:
display a rendering of a hand of the avatar at the relative position with the virtual controller within the rendering of the hand;
determine a distance and a direction of an updated location in the room space of the one or more fingers making the first gesture compared to the initial location in the room space of the one or more fingers making the first gesture;
display an animation of the hand moving from the relative position in the world space in the direction of the updated location; and
display an indicator of a locomotion input coordinated with the animation of the hand moving from the relative position in the direction of the updated location.

20. The computer-readable storage medium of claim 17, wherein the instructions further configure the at least one processor to:
receive, from the tracking service, the updated location in the room space of the one or more fingers making the first gesture;
determine a distance and a direction of the updated location in the room space of the one or more fingers making the first gesture compared to the initial location in the room space of the one or more fingers making the first gesture;
the control of the locomotive movement of the avatar based on the distance and the direction of the updated location compared to the initial location.

* * * * *